United States Patent [19]

Dent et al.

[11] Patent Number: 5,559,886
[45] Date of Patent: Sep. 24, 1996

[54] METHOD OF CARRYING OUT AN AUTHENTICATION CHECK BETWEEN A BASE STATION AND A MOBILE STATION IN A MOBILE RADIO SYSTEM

[75] Inventors: Paul W. Dent, Stehag; Alex K. Raith, Kista; Jan E. Å. S. Dahlin, Järfälla, all of Sweden

[73] Assignee: Telefonaktiebolaget LM Ericsson, Stockholm, Sweden

[21] Appl. No.: 298,782

[22] Filed: Aug. 31, 1994

Related U.S. Application Data

[63] Continuation of Ser. No. 43,758, Apr. 7, 1993, Pat. No. 5,390,245, which is a continuation of Ser. No. 655,771, Feb. 15, 1991, Pat. No. 5,220,605, which is a continuation of Ser. No. 68,234, May 27, 1993, Pat. No. 5,282,250.

[30] Foreign Application Priority Data

Mar. 9, 1990 [SE] Sweden .................................. 9000856

[51] Int. Cl.⁶ ............................... H04L 9/00; H04L 9/32
[52] U.S. Cl. .................. 380/23; 340/825.31; 340/825.34
[58] Field of Search .................. 380/23, 25; 340/825.31, 340/825.34; 379/62

[56] References Cited

U.S. PATENT DOCUMENTS

| | | | |
|---|---|---|---|
| 4,268,715 | 5/1981 | Atalla | 380/23 |
| 4,436,957 | 3/1984 | Mazza et al. | 379/62 |
| 4,654,481 | 3/1987 | Corris et al. | 379/62 |
| 4,992,783 | 2/1991 | Zdunek et al. | 340/825.34 |
| 4,995,083 | 2/1991 | Baker et al. | 380/23 |
| 5,077,790 | 12/1991 | D'Amico et al. | 380/23 |

FOREIGN PATENT DOCUMENTS

| | | |
|---|---|---|
| 3405381 | 8/1985 | Germany . |
| 3420460 | 12/1985 | Germany . |

OTHER PUBLICATIONS

H. Beker and F. Piper, Cipher Systems—The Protection of Communications, pp. 305–311, 320–322, published in Great Britain (1982).

"EIA Project No. 2215", pp. 2–72 to 2–73, published in Dec. 1989 by Electronic Industries Association Engineering Department.

Primary Examiner—Bernarr E. Gregory
Attorney, Agent, or Firm—Burns, Doane, Swecker & Mathis

[57] ABSTRACT

Methods for carrying out an authentication check in a mobile telephone system in which an authentic base station serves a plurality of mobile stations. A prior method carried out a unidirectional check from the base to a calling mobile, permitting a false base to carry out a false authentication check by collecting a number of so-called RAND-Response pairs. To avoid this problem, another unidirectional, base-to-mobile, authentication check and an authentication check from the mobile to the base are carded out. In one embodiment, only the bi-directional authentication check is carried out.

16 Claims, 2 Drawing Sheets

METHOD OF CARRYING OUT AN AUTHENTICATION CHECK BETWEEN A BASE STATION AND A MOBILE STATION IN A MOBILE RADIO SYSTEM

This application is a continuation of application Ser. No. 08/043,758, filed Apr. 7, 1993, now U.S. Pat. No. 5,390,245, which is a continuation of application Ser. No. 07/655,771, filed Feb. 15, 1991, which became U.S. Pat. No. 5,220,605, now abandoned in favor of File Wrapper Continuing application Ser. No. 08/068,234, filed May 27, 1993, now U.S. Pat. No. 5,282,250 issued Jan. 25, 1994.

TECHNICAL FIELD

The present invention relates to a method of carrying out an authentication check between a base station and a mobile station in a mobile radio system, particularly in a cellular mobile telephone system. The proposed method can also be applied with other mobile radio systems, for instance paging systems.

BACKGROUND ART

In the case of a cellular mobile telephone system for instance, an authentication check is carried out before a call is set up between the mobile and the base station. The base station asks for information concerning the mobile, with respect to its identity, by ordering the mobile to send an identification number. The mobile is therewith forced to reveal its identity to the base station, so that the base station will know that the mobile is authorized to send a call over the system and so that the base station and also the exchange will know which mobile shall be charged for the call subsequently set up.

On the other hand, the mobile station must be certain that it communicates with the authentic base station, i.e. with a base station which is truly authorized to put connect a call when the mobile is the calling party (the mobile is an A-subscriber), and that the mobile station will be charged correctly for the call.

For the purpose of performing an authentication check, it is earlier known to formauthentication signals, "Resp"-signals, in the base station and the mobile station. A random number (RAND) is sent from the base to mobiles within the area covered by the base station. The calling mobile answers with a given signal (Resp 1). In a similar manner, the base station forms the same signal Resp 1 from the random number and the identity of the calling mobile. These signals normally coincide and the base station orders the mobile to a speech channel.

DISCLOSURE OF THE INVENTION

Thus, in the aforesaid known method of carrying out authentication checks, there is formed a RAND-Response pair for a given mobile station, i.e. a given Response signal is formed in the mobile for a given received random number RAND, and a base station can thus receive a number of such response signals for a number of different random numbers. This means that it is possible to establish a "false" base station which is able to transmit a number of mutually different random numbers and receives a corresponding (different) number of Response signals. The false base station is therewith able to create a mobile subscription which is not authorized to send calls over the system. This drawback or deficiency of the known authentication check is due to the fact that the check is uni-directional, namely it is only the base station which requires the response signal in proof of the authentication of the mobile.

According to the present method, the authentication check is bi-directional, i.e. it is not only the base station which requires the identity of the mobile, but that the mobile also requires the identity of the base station.

The object of the present invention is thus to provide an improved authentication check method which renders impossible manipulation by a false base station with the intention of obtaining access to the authentication code of the mobile telephone system.

The inventive method is characterized by the steps set forth in the characterizing clause of claim 1. Further developments of the proposed method are set forth in depending claims 2–3.

BRIEF DESCRIPTION OF THE DRAWINGS

The invention will now be described in more detail with reference to the accompanying drawings, in which.

BEST MODE OF CARRYING OUT THE INVENTION

Figure 1:
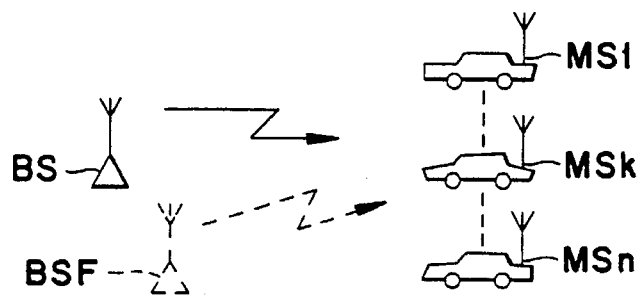
FIG. 1 illustrates schematically communication between two base stations and a plurality of mobile stations.

FIG. 1 illustrates an authentic base station BS which listens by transmitting random numbers to a plurality of mobiles MS1–MSn over a given control channel. Of these mobiles, a response is received from a mobile MSk which indicates that it wishes to establish a call over a given speech channel. As described above, a uni-directional authentication check is carried out, where the base station requires a response Resp 1 from the mobile MSk. This will be described below in more detail with reference to FIG. 2. Since the connection is unidirectional during this stage, a false base station BSF is able to obtain a response from a number of mobiles when transmitting the aforesaid random number RAND, in the aforesaid manner. The base station BSF is therewith able to create a bank of RAND-Response replies, which can then be utilized in an unauthorized manner by a mobile station.

Figure 2:
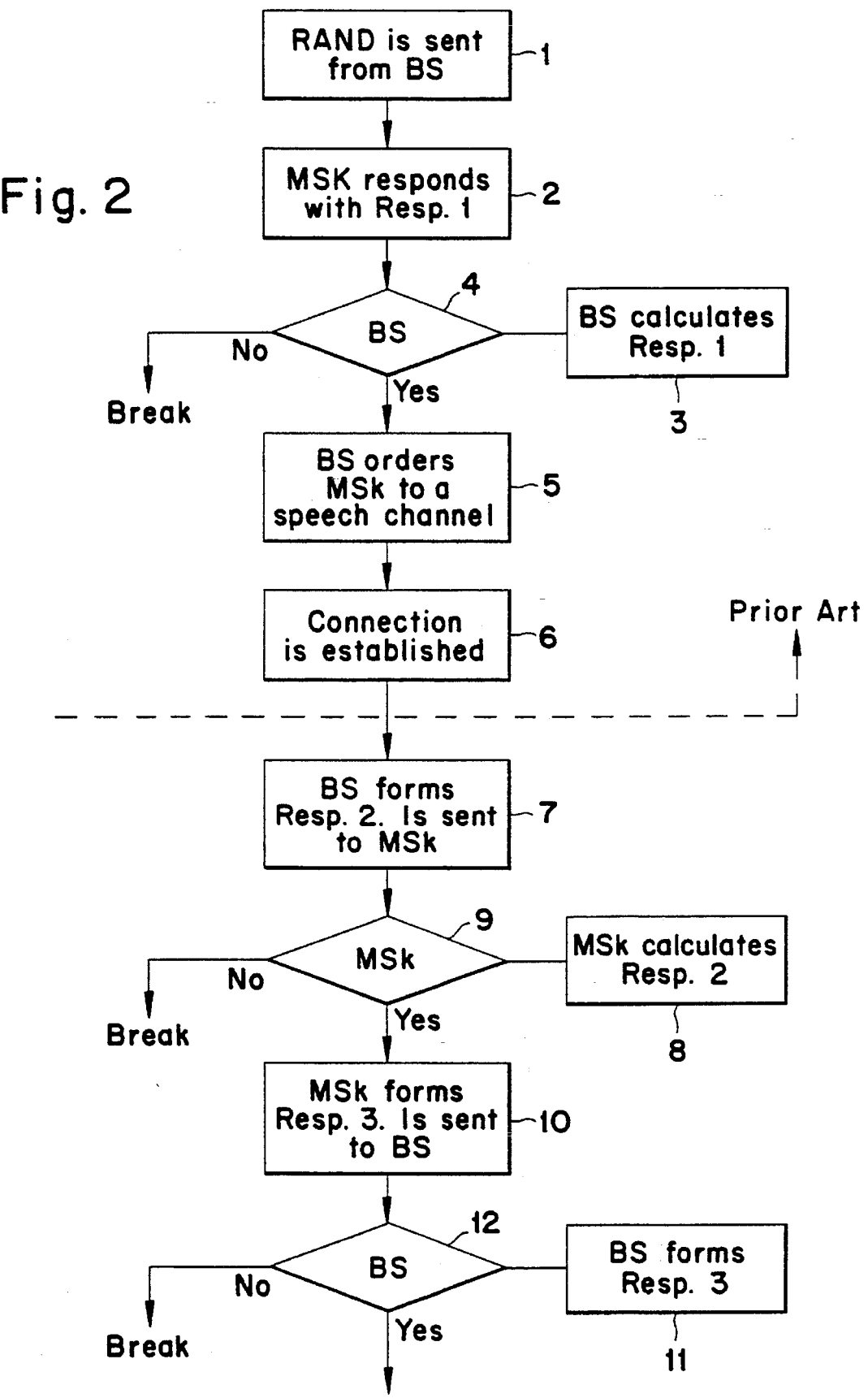
FIG. 2 is a flow sheet which illustrates one embodiment of the proposed method.

In order to make this impossible, there is proposed in accordance with the invention an authentication method disclosed in the flow chart of FIG. 2.

An authentic base station BS listens to a number of mobiles MS1–MSn within the area covered by said base station, by transmitting a random number RAND, block 1.

Figure 3:
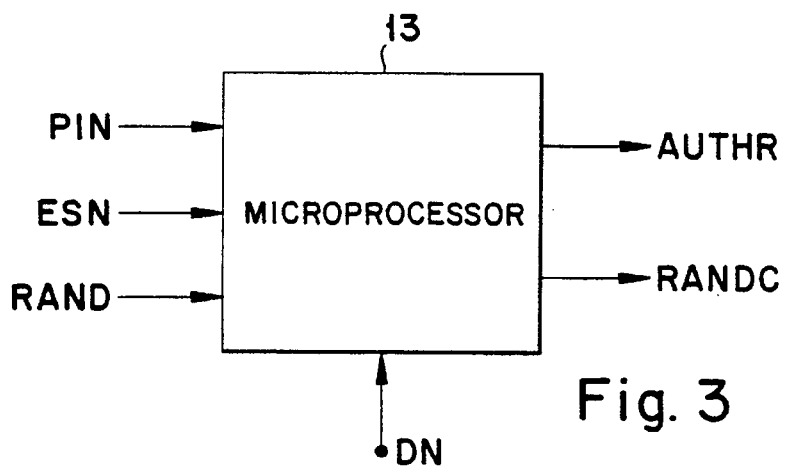
FIG. 3 is a block schematic of the input and output magnitudes of an authenticity algorithm incorporated in a mobile station.

A given mobile station MSk wishing to establish a call, answers with a signal Resp 1, block 2. This signal is formed in the microprocessor of the mobile from a number of input data PIN, ESN and DN, in addition to the random number RAND received, see FIG. 3, where PIN represents the personal identification number of the mobile, ESN represents the electronic serial number of the mobile, and DN represents the number dialled. The mobile station MSk is therewith an A-subscriber. The microprocessor 13 then delivers the Resp 1 signal, which consists of an 18-bit AUTH-signal and an 8-bit RANDC-signal, which is sent to the base station.

The base station calculates Resp 1 in a corresponding manner, block 3, from the incoming signals AUTH and RANDC and makes a comparison with the value of the Resp-signal calculated and transmitted by the mobile, block 4. When these coincide, the base station orders the mobile to a given, allocated speech channel, block 5, and the connection is established in a known manner, block 6. The aforedescribed method is previously known.

According to the proposed method, the base station now forms a response signal Resp 2 from a further random number RAND 2 and from the personal identification number PIN of the mobile, this number being known in the base station (blocks 2, 3). Both Resp 2 and RAND 2 are sent to the mobile, block 7. The mobile station forms a value of Resp 2 from its PIN and the received random number RAND 2, block 8. A comparison is now made in the mobile, block 9, between the received Resp 2 and the formed value of Resp 2. If these two values coincide, the mobile forms a value Resp 3 and sends this value to the base station, block 10. Resp 3 is formed from RAND 2 and PIN in the mobile. The base station forms Resp 3 in a similar manner from RAND 2 and PIN, which are known in the base station, block 11. A comparison is then made, block 12, between the received and formed values of Resp 3. If the values coincide, connection of the call continues to establish a speech connection.

The method steps according to block 7, 8 and 9 provide an authentication check in which the mobile decides whether or not the base station is authentic, since verification of the signal Resp 2 sent from the base station takes place in the mobile, and against a value Resp 2 calculated in said mobile. The signal Resp 2 from the base station can therefore be taken as a response signal from said station. The aforedescribed method constitutes the main difference between the proposed method and the known method according to blocks 2, 3 and 4.

The check carried out in accordance with blocks 10, 11 and 12 constitutes substantially a repetition of the method according to blocks 2, 3 and 4, i.e. a check from the base station that the mobile is authentic.

An essential difference in relation to the known authenticity method (blocks 1–4) is that the mobile also requires a response Resp 2 from the base station and verifies this response in accordance with blocks 7–9. A false base station must therefore know exactly how this response signal shall be calculated. The check is therewith bidirectional.

The authentication check according to blocks 2, 3 and 4 can be carried out on a general control channel in the mobile radio system, and the authentication check according to blocks 7–12 can be carried out on the speech channel established between the base station BS and the mobile MSk (blocks 5 and 6).

Figure 4:
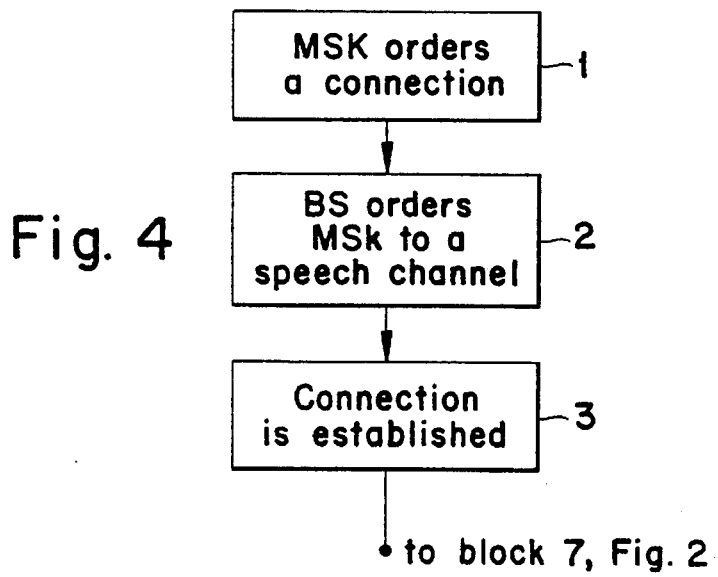
FIG. 4 is a flow sheet which illustrates another embodiment of the proposed method.

FIG. 4 is a block diagram illustrating the first method steps in the case when solely a bidirectional authentication check is carried out. In this case, the steps according to blocks 1–3 replace the steps according to blocks 1–6 in FIG. 2. In this case, no unidirectional (and known) authentication check is carried out prior to the bidirectional check. A calling mobile, for instance MSk, asks for a connection from the base station BS. When receiving this call request, the base station BS looks for a free speech channel and orders the mobile MSk to this free channel. In this way, a free connection is established over the speech channel without carrying out an authentication check. The actual authentication check is then carried out in the manner aforedescribed with reference to blocks 7–12 of FIG. 2, i.e. only a bidirectional authentication check is carried out.

We claim:

1. A method for authenticating a base station and a mobile station in a mobile radio system, the method comprising the steps of:

prior to establishing a connection, sending from the base station an interrogative message concerning authenticity of the mobile station;

sending from the mobile station a first response signal;

using the first response signal in the base station to preliminarily establish the authenticity of the mobile station;

subsequent to preliminarily establishing the authenticity of the mobile station, sending from the base station a second response signal and a first value to the mobile station;

using the first value in the mobile station to form a first corresponding signal and comparing the first corresponding signal with the second response signal, thereby alternatively establishing or disproving authenticity of the base station; and when the authenticity of the base station has been established, sending from the mobile station a third response signal and using the third response signal in the base station to finally establish the authenticity of the mobile station.

2. A method according to claim 1, wherein the first value is a pseudo-random number produced in the base station, and said second response signal is formed from the pseudo-random number and from an identification number of the mobile station, and the authenticity of the base station is established by comparing said second response signal with the first corresponding signal produced in the mobile station based on the pseudo-random number and the identification number of the mobile station.

3. A method according to claim 2, wherein said third response signal zero to the base station is formed from said pseudo-random number and from the identification number of said mobile station, and said base station forms a second corresponding signal from said pseudo-random number and the identification number of the mobile station, and the base station compares the third response signal and the second corresponding signal, wherein agreement between said signals indicates that a speech connection can be established between the base station and the mobile station.

4. A method according to claim 1, wherein if the authenticity of the base station is not established in the mobile station, then the mobile station does not send the third response signal to the base station.

5. A method of authenticating a base station and a mobile station in a mobile radio system, the method comprising the steps of:

the mobile station requesting service from the base station;

forming in the base station, in response to the request for service, a first response signal and sending said first response signal to the mobile station;

forming in the mobile station a first corresponding signal, and comparing the first corresponding signal with the first response signal, thereby alternatively establishing or disproving authenticity of the base station;

subsequent to establishing the authenticity of the base station, sending a second response signal from the mobile station to the base station; and forming in the base station a second corresponding signal and comparing the second corresponding signal with the second response signal, thereby alternatively establishing or disproving authenticity of the mobile station.

6. A method according to claim 5, wherein said first response signal is formed from a pseudo-random number produced in the base station and from an identification number of the mobile station, the base station sends the pseudo-random number to the mobile station, and the authenticity of the base station is established by comparing said first response signal with a signal produced in the mobile station based on the pseudo-random number and the identification number of the mobile station.

7. A method according to claim 6, wherein said second response signal sent to the base station is formed from said pseudo-random number and from the identification number of the mobile station, the base station forms the second corresponding signal from said pseudo-random number and from the identification number of the mobile station, and the base station compares the second corresponding signal and the second response signal and establishes a speech connection with the mobile station when the second response signal and the second corresponding signal coincide.

8. A method according to claim 5, wherein if the authenticity of the base station is not established in the mobile station, then the mobile station does not send the second response signal to the base station.

9. A method for authenticating a base station and a mobile station in a mobile radio system, the method comprising the steps of:

prior to establishing a connection, sending from the base station an interrogative message concerning authenticity of the mobile station;

sending from the mobile station a first response signal;

using the first response signal in the base station to preliminarily establish the authenticity of the mobile station, and in response to preliminary establishment of the authenticity of the mobile station, establishing a service connection on a traffic channel;

using the established service connection on the traffic channel to send a second response signal and a first value from the base station to the mobile station;

using the first value in the mobile station to form a first corresponding signal and comparing the first corresponding signal with the second response signal, thereby alternatively establishing or disproving authenticity of the base station; and when the authenticity of the base station has been established, sending from the mobile station a third response signal and using the third response signal in the base station to finally establish the authenticity of the mobile station.

10. A method according to claim 9, wherein said first value is a pseudo-random number produced in the base station, and said second response signal is formed from the pseudo-random number and from an identification number of the mobile station, and the authenticity of the base station is established by comparing said second response signal with the first corresponding signal produced in the mobile station based on the pseudo-random number and the identification number of the mobile station.

11. A method according to claim 10, wherein said third response signal sent to the base station is formed from said pseudo-random number and from the identification number of said mobile station, and said base station forms a second corresponding signal from said pseudo-random number and the identification number of the mobile station, and the base station compares the third response signal and the second corresponding signal, wherein agreement between said signals indicates that a speech connection can be established between the base station and the mobile station.

12. A method according to claim 9, wherein if the authenticity of the base station is not established in the mobile station, then the mobile station does not send the third response signal to the base station.

13. A method of authenticating a base station and a mobile station in a mobile radio system, the method comprising the steps of:

the mobile station requesting service from the base station;

sending a service channel allocation from the base station to the mobile station;

forming in the base station, in response to the request for service, a first response signal and sending said first response signal to the mobile station after establishing connection on said allocated service channel;

forming in the mobile station a first corresponding signal and comparing the first corresponding signal with the first response signal, thereby alternatively establishing or disproving authenticity of the base station;

subsequent to establishing the authenticity of the base station, sending a second response signal from the mobile station to the base station; and forming in the base station a second corresponding signal and comparing the second corresponding signal with the second response signal, thereby alternatively establishing or disproving authenticity of the mobile station.

14. A method according to claim 13, wherein said first response signal is formed from a pseudo-random number produced in the base station and from an identification number of the mobile station, the base station sends the pseudo-random number to the mobile station, and the authenticity of the base station is established by comparing said first response signal with a signal produced in the mobile station based on the pseudo-random number and the identification number of the mobile station.

15. A method according to claim 14, wherein said second response signal sent to the base station is formed from said pseudo-random number and from the identification number of the mobile station, the base station forms the second corresponding signal from said pseudo-random number and from the identification number of the mobile station, and the base station compares the second corresponding signal and the second response signal and establishes a speech connection with the mobile station when the second response signal and the second corresponding signal coincide.

16. A method according to claim 13, wherein if the authenticity of the base station is not established in the mobile station, then the mobile station does not send the second response signal to the base station.

* * * * *